(12) United States Patent
Becker Hof et al.

(10) Patent No.: US 9,673,953 B2
(45) Date of Patent: Jun. 6, 2017

(54) MESSAGING NETWORK WITH A CONTROL DATA CHANNEL

(71) Applicant: MARKPORT LIMITED, Dublin (IE)

(72) Inventors: Onno Becker Hof, Pijnacker (NL); Doede De Boer, Nieuwegein (NL)

(73) Assignee: MARKPORT LIMITED (IE)

( * ) Notice: Subject to any disclaimer, the term of this patent is extended or adjusted under 35 U.S.C. 154(b) by 60 days.

(21) Appl. No.: 14/401,889

(22) PCT Filed: Oct. 11, 2013

(86) PCT No.: PCT/EP2013/071338
§ 371 (c)(1),
(2) Date: Nov. 18, 2014

(87) PCT Pub. No.: WO2014/086523
PCT Pub. Date: Jun. 12, 2014

(65) Prior Publication Data
US 2015/0131559 A1    May 14, 2015

Related U.S. Application Data

(60) Provisional application No. 61/734,053, filed on Dec. 6, 2012.

(51) Int. Cl.
*H04L 5/00* (2006.01)
*H04L 12/18* (2006.01)
(Continued)

(52) U.S. Cl.
CPC ........ *H04L 5/0053* (2013.01); *H04L 12/1822* (2013.01); *H04L 51/06* (2013.01); *H04W 4/12* (2013.01); *H04L 65/4038* (2013.01)

(58) Field of Classification Search
CPC ......... H04W 4/12; H04L 51/06; H04L 5/0053
(Continued)

(56) References Cited

U.S. PATENT DOCUMENTS

| 6,118,780 | A | * | 9/2000 | Dunn | H04M 3/4228 370/355 |
| 2002/0095510 | A1 | * | 7/2002 | Sie | H04N 7/17336 709/231 |

(Continued)

OTHER PUBLICATIONS

International Search Report; PCT/EP2013/071338; Feb. 7, 2014.

*Primary Examiner* — Jae Y Lee
*Assistant Examiner* — Jean F Voltaire
(74) *Attorney, Agent, or Firm* — Ohlandt, Greeley, Ruggiero & Perle, L.L.P.

(57) ABSTRACT

A communication network messaging server (1, 100) and user devices (2, 102) have control channels (10, 21, 110) to send and receive control data. The server sends to an originating device control data indicating recipient availability, status, and/or presence prior to the originating device sending a message. The server control channel (110) includes a multiplexer (104) for streaming between a user message channel and the control channel and maintains device registration data, status data, presence data, and user group management data. The server (100) enables end user initiated availability, status, and/or presence updates to be shared with the messaging network and with recipient devices via said control channel.

20 Claims, 12 Drawing Sheets

(51) Int. Cl.
*H04W 4/12* (2009.01)
*H04L 12/58* (2006.01)
*H04L 29/06* (2006.01)

(58) Field of Classification Search
USPC .................................................. 370/329–332
See application file for complete search history.

(56) References Cited

U.S. PATENT DOCUMENTS

| | | |
|---|---|---|
| 2003/0052915 A1 | 3/2003 | Brown et al. |
| 2004/0073643 A1* | 4/2004 | Hayes .................. G06Q 10/107 709/223 |
| 2006/0244818 A1* | 11/2006 | Majors ................ H04L 12/1822 348/14.08 |
| 2011/0268046 A1* | 11/2011 | Choi .................... H04L 5/0007 370/329 |
| 2012/0002585 A1* | 1/2012 | Kawabata .............. G01N 23/20 370/312 |

* cited by examiner

MESSAGING NETWORK WITH A CONTROL DATA CHANNEL

FIELD OF THE INVENTION

The invention relates to messaging networks having network elements such as MSCs, SMSCs, mobile device management (HLR/VLR/HSS) and MMSCs, and also mobile devices.

PRIOR ART DISCUSSION

Figure 1:
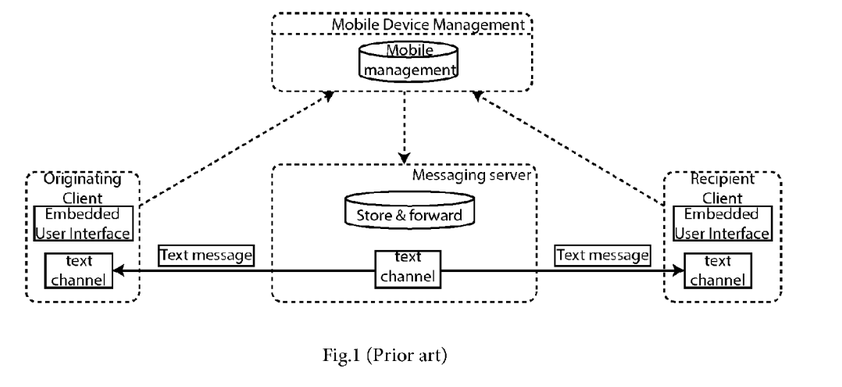
FIG. 1 is a block diagram illustrating a typical messaging architecture in a prior art network as described above.

It has been known for many years for devices to communicate with each other via service centres with store-and-forward capability. The originating client sends a message (submission) to the messaging server (FIG. 1), after which the messaging server checks with the mobile device manager if the recipient is reachable and if so what the delivery path should be. In case the recipient client is not registered on the network the message will be stored until the recipient is reachable again. With the prior art the originating client is not aware of recipient availability or status or presence prior to sending a message. This is shown in FIG. 1.

The invention is directed towards providing an enhanced messaging network, in which there is improved control information distributed across the network elements and/or devices.

SUMMARY OF THE INVENTION

According to the invention, there is provided a communication network comprising a messaging server and a plurality of user devices, wherein the server and the devices include control channels adapted to send and receive control data, and wherein the server is adapted to send to an originating device control data indicating recipient availability, status, and/or presence prior to the originating device sending a message.

In one embodiment, the server control channel includes a multiplexer for streaming between a user message channel and the control channel.

In one embodiment, said control channel maintains device registration data, status data, presence data, and user group management data.

In one embodiment, the server is adapted to enable end user initiated availability, status, and/or presence updates to be shared with the messaging network and with recipient devices via said control channel. In one embodiment, the server is adapted to provide seamless availability, status and/or presence sharing data within closed user groups without the need for state-oriented protocols. Preferably, the server is adapted to utilize the control channel to initiate a dialogue with a device with a short response time including sending a trigger for a device to generate a user interface for inputting data. In one embodiment, said interface is a questions-and-answers framework.

In one embodiment, the server is adapted to register and recognize enhanced messaging client devices and to recognize a type of information which can be shared with the client device. In one embodiment, the server is adapted to process control data in a stateless manner, in which each control data event is processed in a transaction that is independent of any previous or next control data events that are processed.

In one embodiment, at least some of said devices are adapted to perform device-to-device meta data sharing, said meta data containing control information including presence information, and in which the server is adapted to automatically perform a lookup on associated member updates.

In one embodiment, the server is adapted to automatically update a status/presence database, and to then automatically perform a lookup on associated members within a user group table.

In one embodiment, the server is adapted to process mobile network management triggers when devices are registered or de-registered from the network. In one embodiment, said triggers are received from a HLR or a HSS, or a VLR.

In one embodiment, the control channels are adapted to differentiate conventional user messages from control messages by reading at least one unique identifier. In one embodiment, the server is adapted to provide a control channel based on device user opt-in.

In one embodiment, at least some of the devices and the server are adapted to send and receive said control information as part of the payload of a conventional message.

In one embodiment, the server and at least some of the devices are adapted to send and receive said control data using a packet-based protocol. In one embodiment, said protocol is RESTful over HTTP/HTTPS.

In one embodiment, the server is adapted to add control data to a message as payload of a conventional message, to send the message to a store-and-forward element which manages sending without parsing the control data, and is adapted to return the message to the server when the recipient device is ready to receive the message, and the server is adapted to send the message.

In one embodiment, the server is adapted to convert the control data to a packet-based protocol and send it to the recipient device in addition to sending the message. In one embodiment, the server and the store-and-forward element are adapted to retrieve from a profile database the status of the recipient device, and the server is adapted to add control data only if the recipient device is capable of communicating with the packet-based protocol and to interpret the control data.

In another aspect, the invention provides a communication method implemented in a network comprising a messaging server and a plurality of user devices, wherein the server and the devices include control channels adapted to send and receive control data, and wherein the method comprises the server sending to an originating device control data indicating recipient availability, status, and/or presence prior to the originating device sending a message.

In one embodiment, the server control channel multiplexes for streaming between a user message channel and the control channel. In one embodiment, said control channel maintains device registration data, status data, presence data, and user group management data. In one embodiment, the server enables end user initiated availability, status, and/or presence updates to be shared with the messaging network and with recipient devices via said control channel.

In one embodiment, the server provides seamless availability, status and/or presence sharing data within closed user groups without the need for state-oriented protocols, and utilizes the control channel to initiate a dialogue with a device with a short response time including sending a trigger for a device to generate a user interface in a questions-and-answers framework for inputting data.

In one embodiment, the server registers and recognizes enhanced messaging client devices and recognizes a type of information which can be shared with the client device. In one embodiment, the server processes control data in a stateless manner, in which each control data event is processed in a transaction that is independent of any previous or next control data events that are processed.

In one embodiment, at least some of said devices perform device-to-device meta data sharing, said meta data containing control information including presence information, and in which the server automatically performs a lookup on associated member updates. In one embodiment, the server automatically updates a status/presence database, and then automatically performs a lookup on associated members within a user group table. In one embodiment, the server processes mobile network management triggers when devices are registered or de-registered from the network, wherein said triggers are received from a HLR or a HSS, or a VLR.

In one embodiment, the control channels differentiate conventional user messages from control messages by reading at least one unique identifier. Preferably, the server provides a control channel based on device user opt-in. In one embodiment, at least some of the devices and the server send and receive said control information as part of the payload of a conventional message.

In one embodiment, the server and at least some of the devices send and receive said control data using a packet-based protocol. In one embodiment, said protocol is RESTful over HTTP/HTTPS.

In one embodiment, the server adds control data to a message as payload of a conventional message, sends the message to a store-and-forward element which manages sending without parsing the control data, returns the message to the server when the recipient device is ready to receive the message, and sends the message.

In one embodiment, the server converts the control data to a packet-based protocol and sends it to the recipient device in addition to sending the message. In one embodiment, the server and the store-and-forward element retrieve from a profile database the status of the recipient device, and the server adds control data only if the recipient device is capable of communicating with the packet-based protocol and to interpret the control data.

In a further aspect, the invention provides a computer readable medium comprising software code adapted to perform the steps of a method as defined above in any embodiment when executed by a digital processor.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

The invention provides a mechanism by which originating clients will know availability, status, and presence of a recipient prior to sending a message on a messaging technology that does not natively support these services but only provides a text channel.

Figure 2:
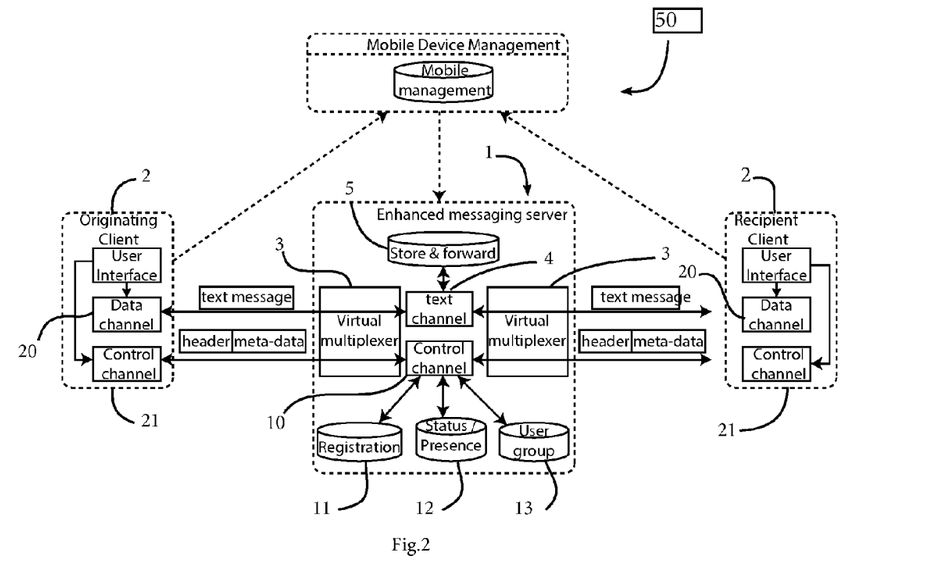
FIG. 2 is a block diagram illustrating a messaging server and client devices of the invention.

FIG. 2 shows mobile device management functions 50 MLR and/or VLR and/or HSS) which are used in a mobile network to register and deregister mobile devices within the mobile network. The mobile device management functions 50 are used by an enhanced messaging server 1 of the invention to determine if a recipient mobile device 2 is registered (connected) as well as to determine the message delivery path. Although the mobile device management functions 50 per se are not part of the invention, they have a role in updating the network based on device state towards the enhanced messaging server 1.

In more detail, FIG. 2 shows a network including the enhanced messaging server 1 and user devices or "clients" 2.

The enhanced messaging server 1 communicates directly with the clients 2. It has multiplexers 3, a text channel 4, a control channel 10 linked with registration (11), presence (12), and user group (13) databases respectively. The multiplexers 3 communicate with the clients 2, which have a data channel 20 and a control channel 21.

The links between the server 1 and the clients 2 illustrate two streams which are multiplexed into the one message. The two streams are a message payload as is conventional, and also control header meta data for control purposes. While they are shown as two parallel lines, they are actually integrated in the one message by the multiplexers 3. The control channel can include information about recipient presence or status or user group and this control information can be sent to the clients before the client sends a message. Messages on the text channel will utilize the store and forward function 5 in case the recipient client 2 is unavailable. Messages on the control channel may utilize the store and forward function 5 in case the recipient client 2 is unavailable.

Also, as shown by the interrupted lines between the clients 2 and the mobile device management systems 50, the clients 2 can communicate in conventional manner without any enhanced services.

Figure 3:
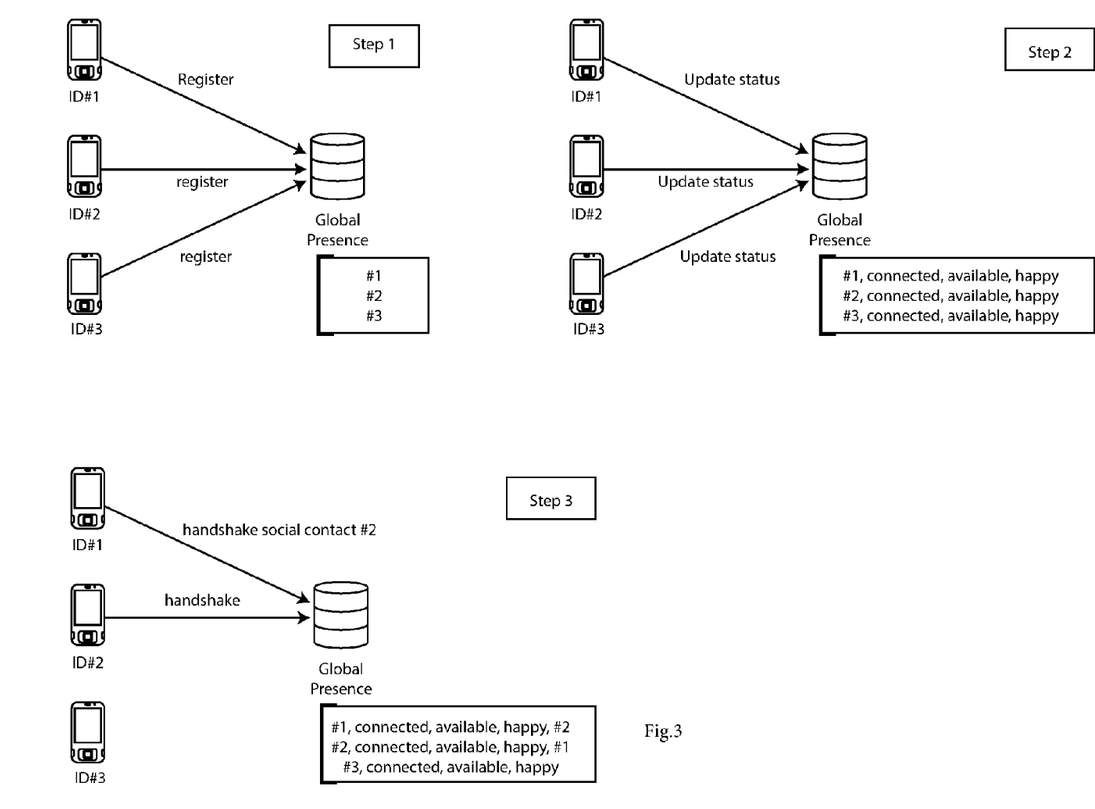
FIG. 3 is a series of flow diagrams for operation of this network.

FIG. 3 shows how a client can register in the network in order to avail of enhanced control communication. The first step (Step 1) is for clients 2 to register to a registration function which is part of the control channel 10 of the server 1. Its role is to manage a list of control channel enabled clients 2. Any client 2 not registered will not receive any control message. The registration indicates if the client has capability for certain formats of update messages towards the client. In one example, a format may be binary encoded control messages to allow most efficient update exchange (encoded or binary mode). Another example is a format which is understandable for the actual recipient message reader (clear text mode). In the example provided client ID #1, 2 and 3 register to the registration function.

After registration (Step 1), the clients 2 can send an update towards a presence function of the control channel 10 (Step 2). This may be client presence, social presence, or other status information. The update is sent as an encoded text message while utilizing the standard text payload construct. The inherent SMS submission handshake will ensure that the update is delivered to the server 1 and avoids the need for higher layer reliability protocols. Hence the implementation remains stateless from a client-to-network point of view.

Client-to-client meta-data sharing of client presence or other types of control information can take place after mutual agreement through a handshake procedure which places client users within a (closed) user group (Step 3). Once completed, each client status change would trigger the presence function to perform a lookup on associated member updates. This way, there is no keep-alive signalling between the network (presence server) and the originating client and as such provides a very lightweight implementation.

In case a client de-registers from the mobile network, the mobile device management function 50 will inform the server 1, triggering an update towards the status/presence database 12. The update will result in another lookup, on associated members within the (closed) user group table 13.

Status update can be initiated by the client 2 through the network. The client 2 can utilize the control channel construct to share any type of update with the server 1. The server 1 represents the network-based status updates which include recipient notification through the control channel construct as well as processing the mobile network management triggers when mobile devices are registered or deregistered from the mobile network. The latter (de)registration process would update the enhanced messaging status and/or presence database 12 for the associated originating clients 2.

It should be borne in mind that SMS is based on a simple next hop handshake mechanism without the need to maintain complex end-to-end state. A message being sent will be confirmed by the next hop and its lifecycle is completed. If no message is to be transferred there is no state to maintain and as such it can be considered resource friendly for both client and server.

The functions 10 and 21 provide a control channel over an existing text messaging infrastructure. The control channel enhances the client-to-network and network-to-client communication with additional meta-data such as device presence, social presence, user groups and provisioning. The meta-data is not limited to those examples. The control channel and associated meta data exchange do not require protocol end points and as such is stateless in nature.

A control channel construct allows the multiplexers 3 to differentiate normal text messages from control messages. The control channel requires at least one unique identifier (but not restricted to) such as shortcode, recipient and/or originating address, message encoding and/or header format. Furthermore it is possible to differentiate on the actual message payload/content.

The client 2 uses the control channel construct 21 to redirect the control channel to a control process of the client. The control process processes the control message and translates it back into for example an update of the client address book status which is linked to the messaging applications.

In the opposite direction, the control channel construct 21 provides a client application with the possibility to send additional meta data to the messaging server 1 to provide information about for example presence or provisioning tasks. The control channel construct 21 allows differentiated processing at the associated messaging processing units. Since the text and control channels are separated by the virtual multiplexer 3 the enhanced messaging server 1 can provide different triggers towards the charging environment. A typical implementation would be to charge per message for the text channel usage (common practice) and not to charge for the control channel usage since this would be less "predictable" from a user point of view. The virtual multiplexer 3 provides the flexibility to differentiate charging and processing of messages.

The control channel can be based on an opt-in principle which requires the client 2 to initiate registration for membership. Once membership is established the network will provide the appropriate channel association and management.

The invention also provides triggering capabilities to an application framework on the client. In one embodiment, an application framework provides an empty shell which just needs meta data to start presenting the framework to the end-user. An example of such an application framework is multiple choice questions which consist of a multiple choice frame which is started and populated with questions/answers content. The application framework would be triggered through the control channel construct and as such the content will not be displayed through the normal text message application. In addition, the use of the control channel may allow differentiated processing (charging for example), allowing more refined control of its use by both the client and the network.

With the above the network can utilize distributed processing for complex dialogue interactions. Also, the invention minimizes traffic flows between the clients and the network through use of the distributed logic and exchange of results instead of step-by-step handshake.

The application framework can be installed on the client environment through a variety of means.

Figure 4:
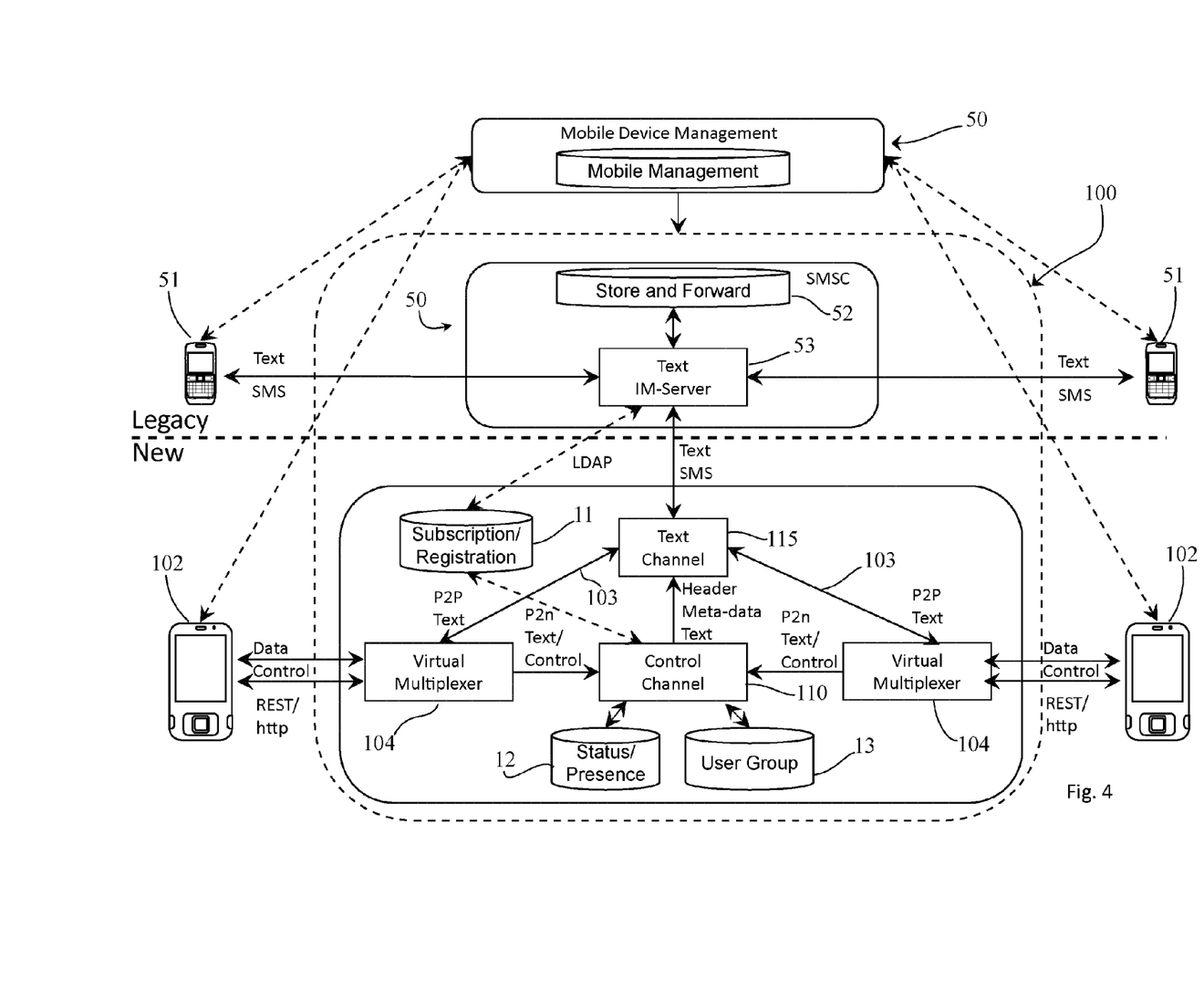
FIG. 4 is a block diagram illustrating a messaging server of another embodiment.

FIG. 4 shows an enhanced messaging server 100 of another embodiment, communicating with enhanced clients 102 and legacy clients 51. An SMSC 52 with conventional store-and-forward capability is shown, as is a text IM server 53 which communicates with the legacy devices 51. As above, there are various conventional mobile device management network elements 50. These operate as normal with conventional mobile devices 51. However, they also operate with devices 102 which have client software of the invention in cases where the clients 102 wish to use the conventional services. This is illustrated by the links 103 from the multiplexers 104 in the server 100. The server 100 has a control channel 110 which interfaces with multiplexers 104, and also parts similar to those described with reference to FIG. 2 are given the same reference numerals. The server 100 also has a text channel 115 for routing of messages for handling in a conventional manner.

The embodiment of FIG. 4 is different from that of FIG. 2 because the control data which is injected as meta data in an SMS header is only used internally within the server 100. The control channel 110 injects such control data and sends it to the text channel function 115. The function 115 does not recognize the control data and merely treats the message like a conventional SMS message. In doing so, it uses the facilities of the text IM server 53 which in turn uses the store-and-forward capability of the SMSC 52. The function 53 also uses the facilities of the mobile management functions 50 to determine if the message should be onward routed to a legacy device 51 in conventional manner or routed to a device 102.

If the destination is a legacy device 51 the control channel 110 will not have injected control data and the message is handled in a conventional manner. However, if the subscription/registration database 11 indicates that the destination device is a device 102, then the control channel 110 may inject control data and use the message-handling functions 115 and 53. These do not recognize the data but do know to route the message (when it can be sent) via the virtual multiplexer 104. This interprets the control data which has been injected and converts it into REST format for routing on to the device 102. This routing via REST over HTTP is IP-based with separate packets for the normal message and the control data.

Advantageously, the control channel 110 is stateless and this is possible because the store-and-forward facilities for the elements 52 and 53 can be utilized even though these elements are not aware that the messages include injected control data.

Figure 5:
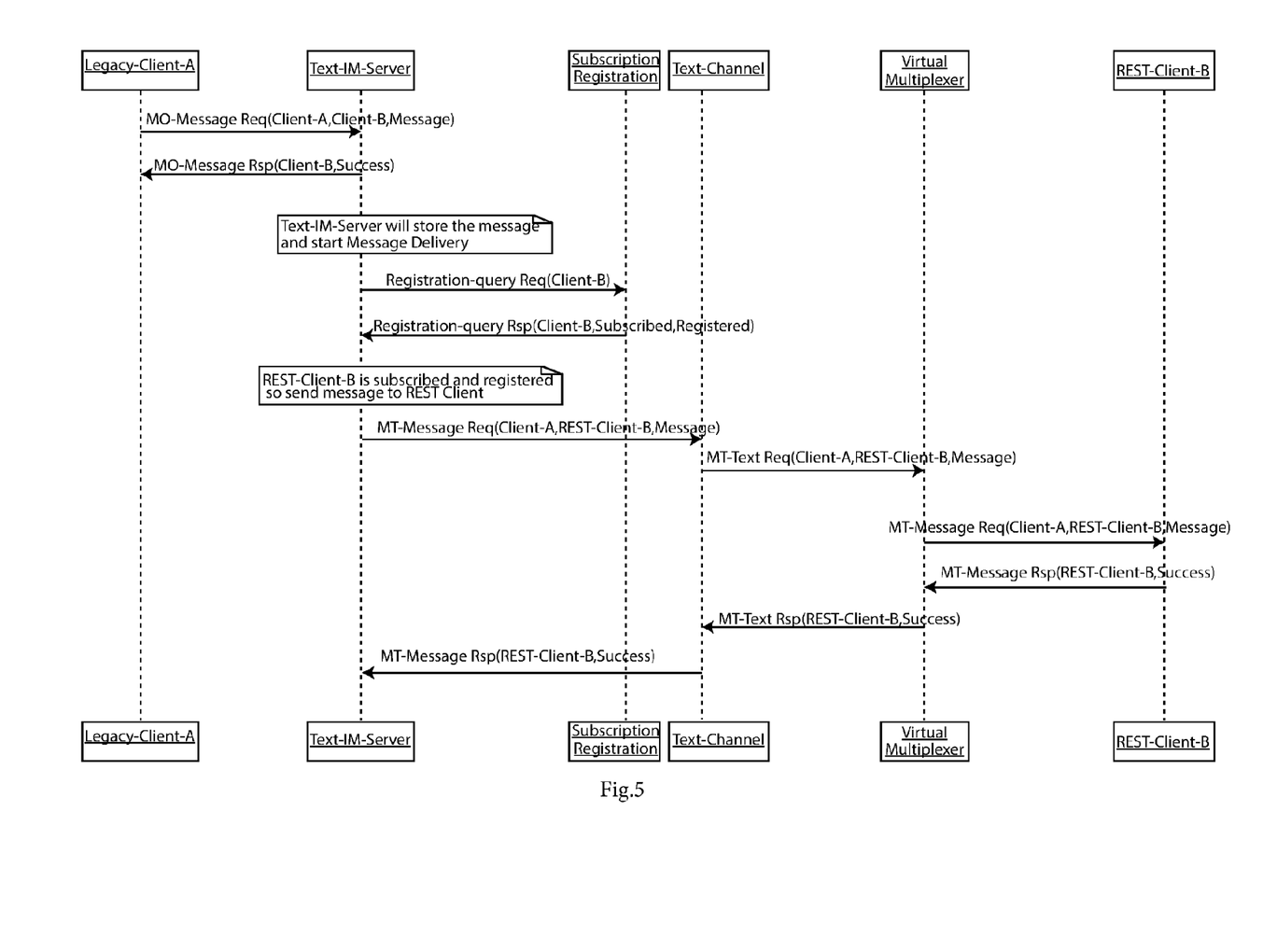
FIGS. 5 to 12 are ladder diagrams illustrating operation of the server of FIG. 4.
Figure 6:
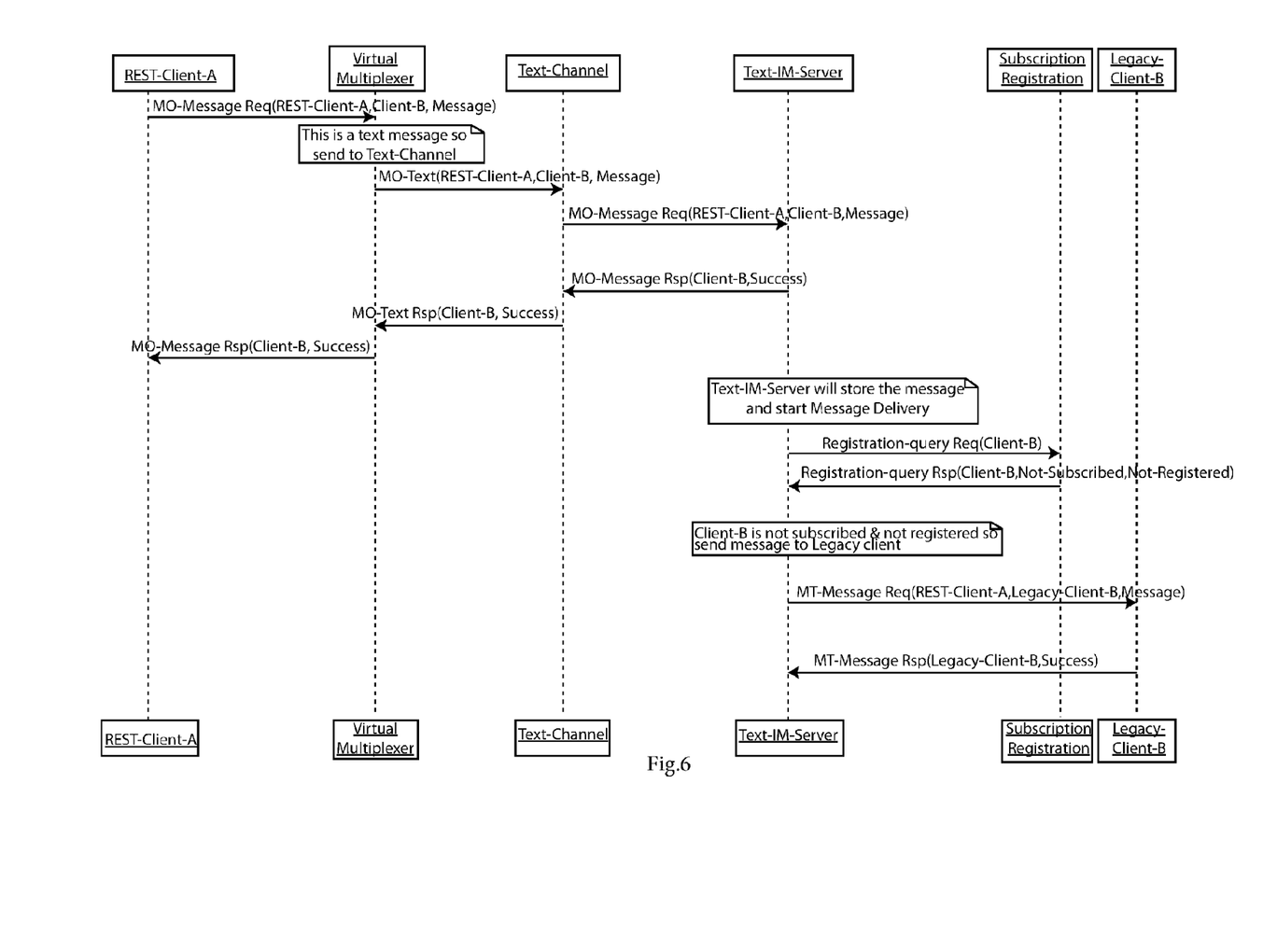
Figure 7A:
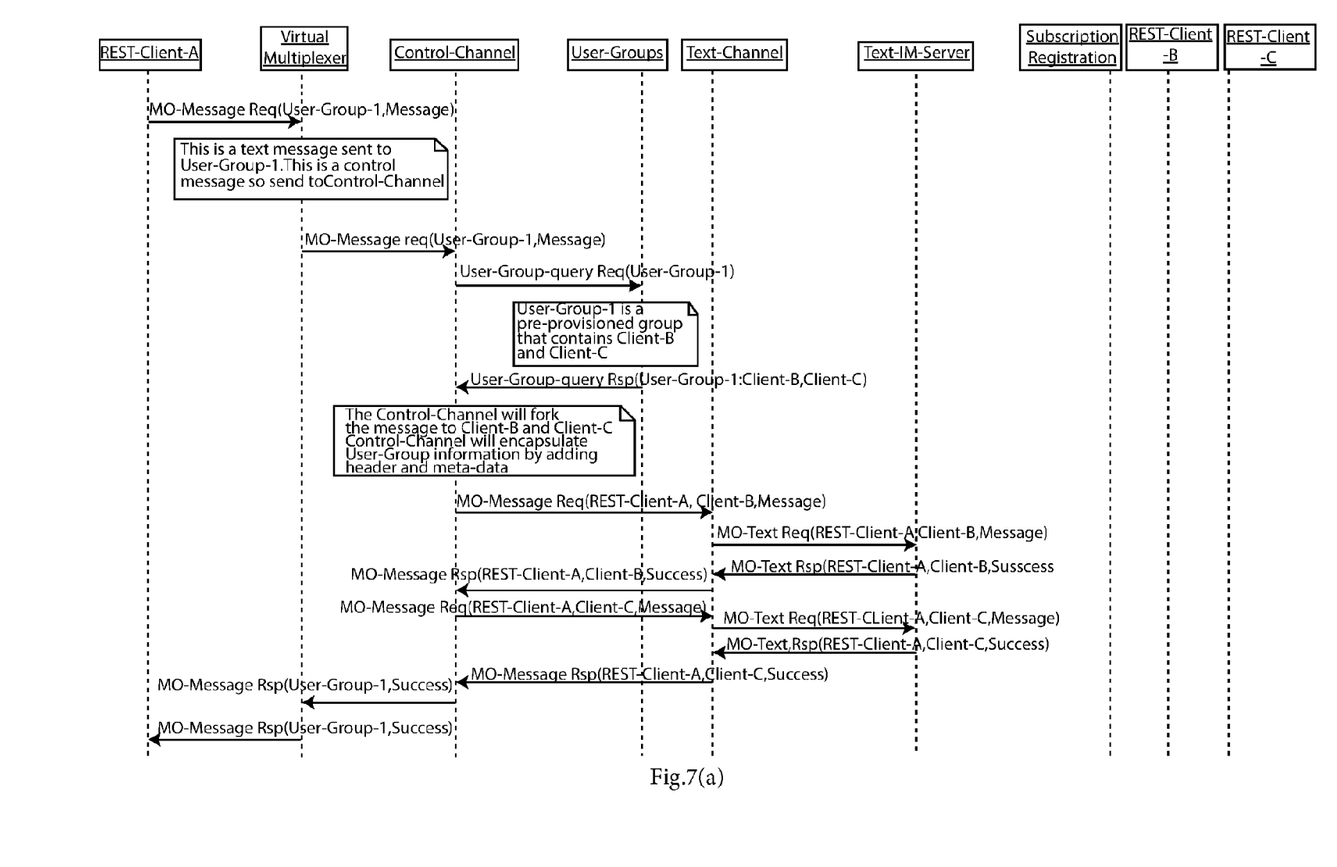
Figure 7B:
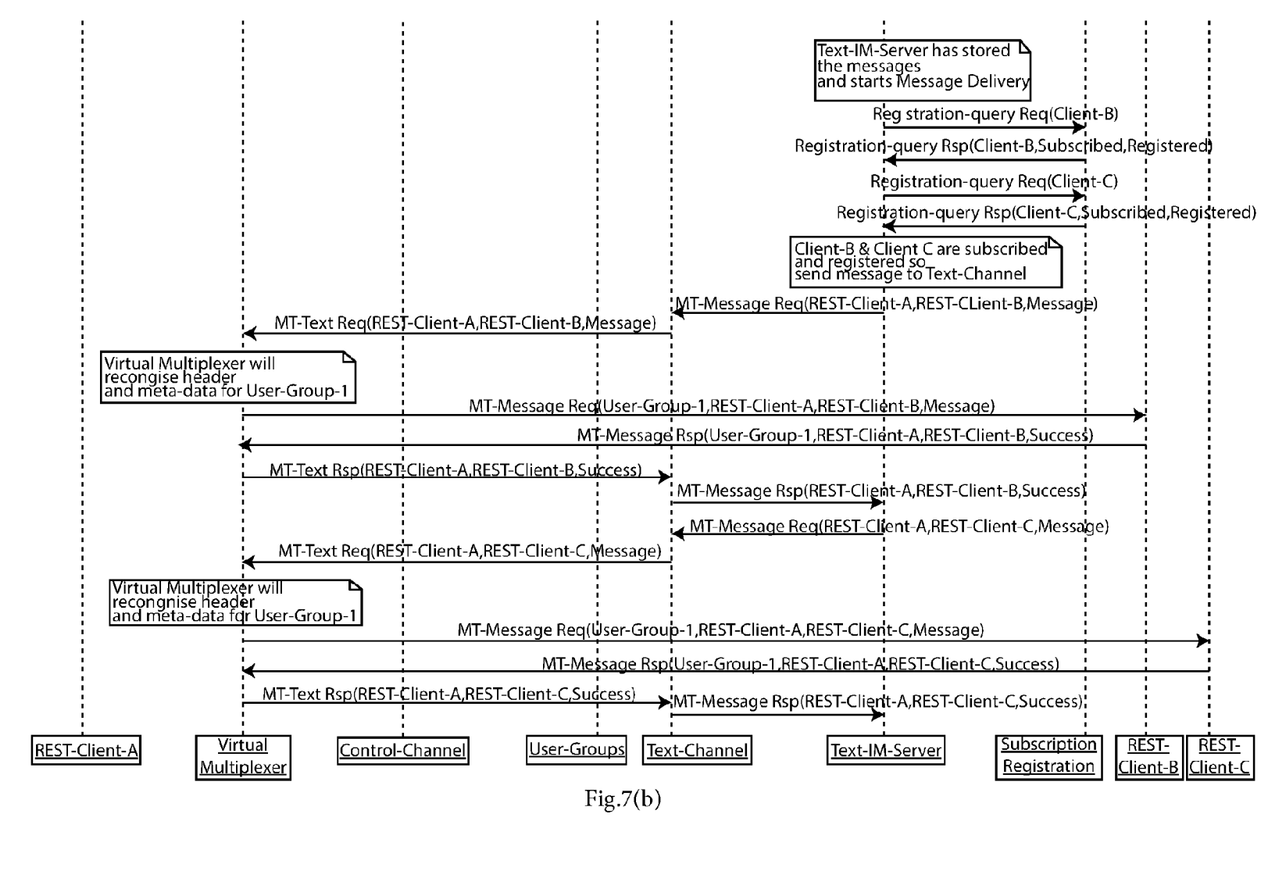
Figure 8:
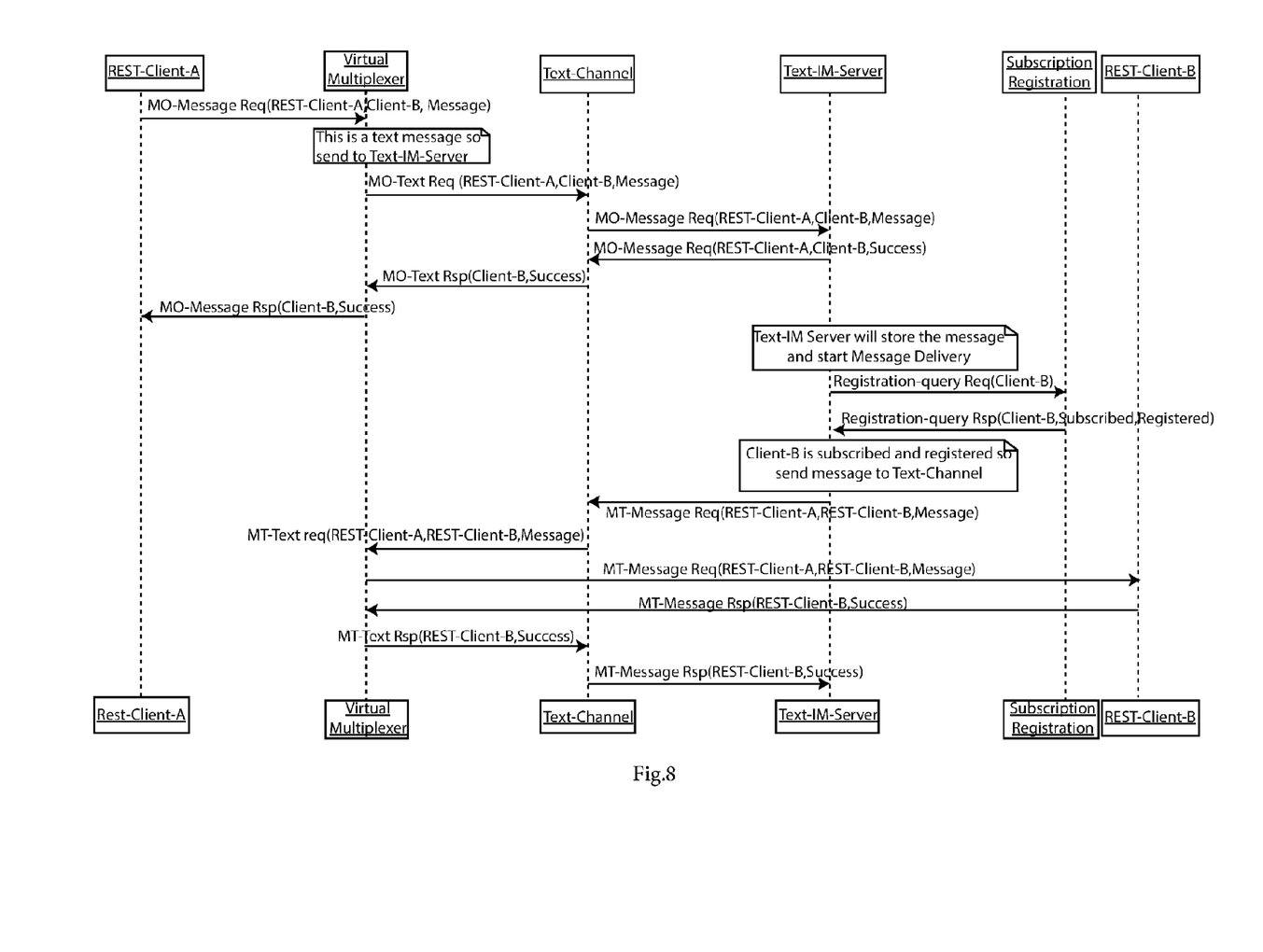
Figure 9:
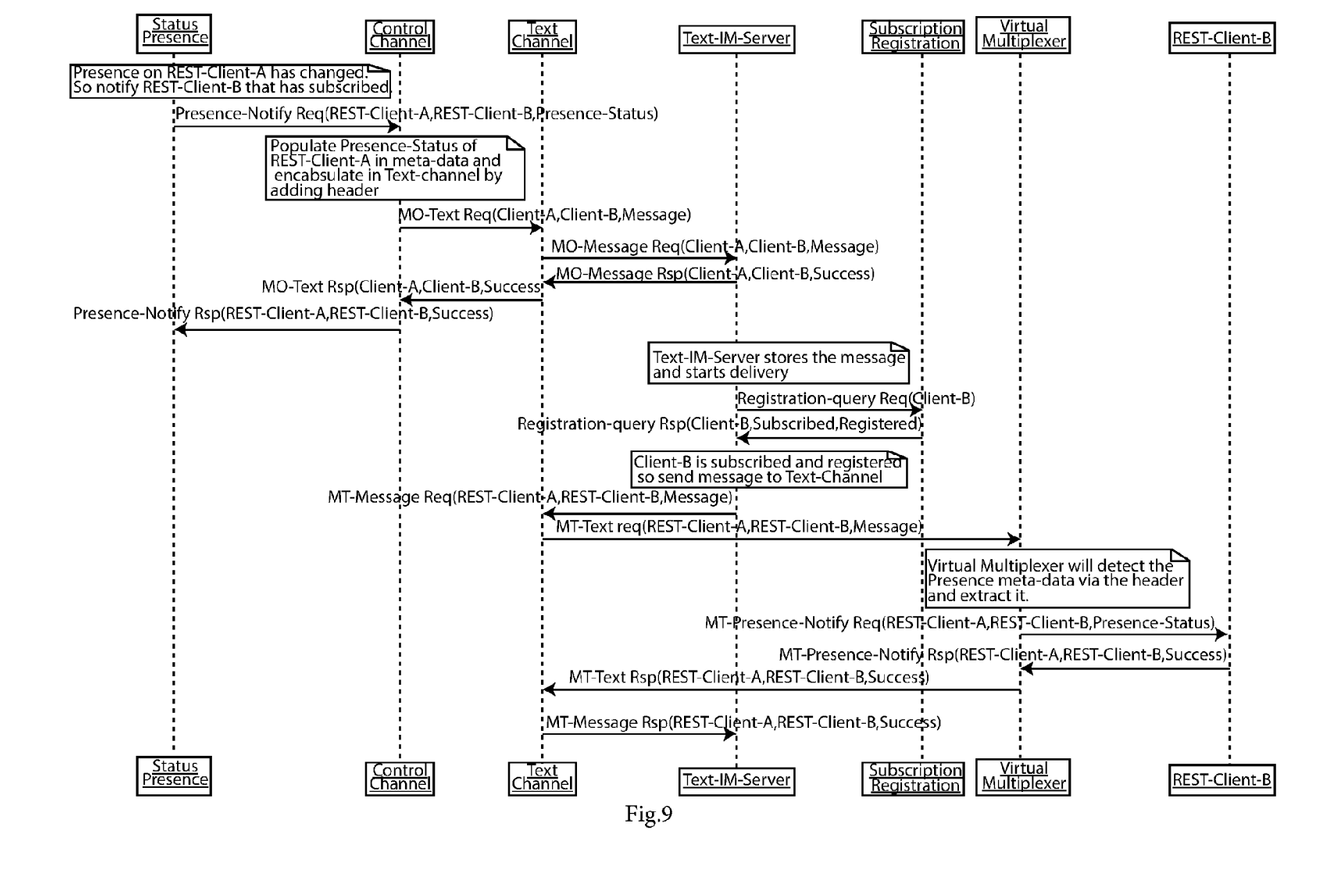
Figure 10:
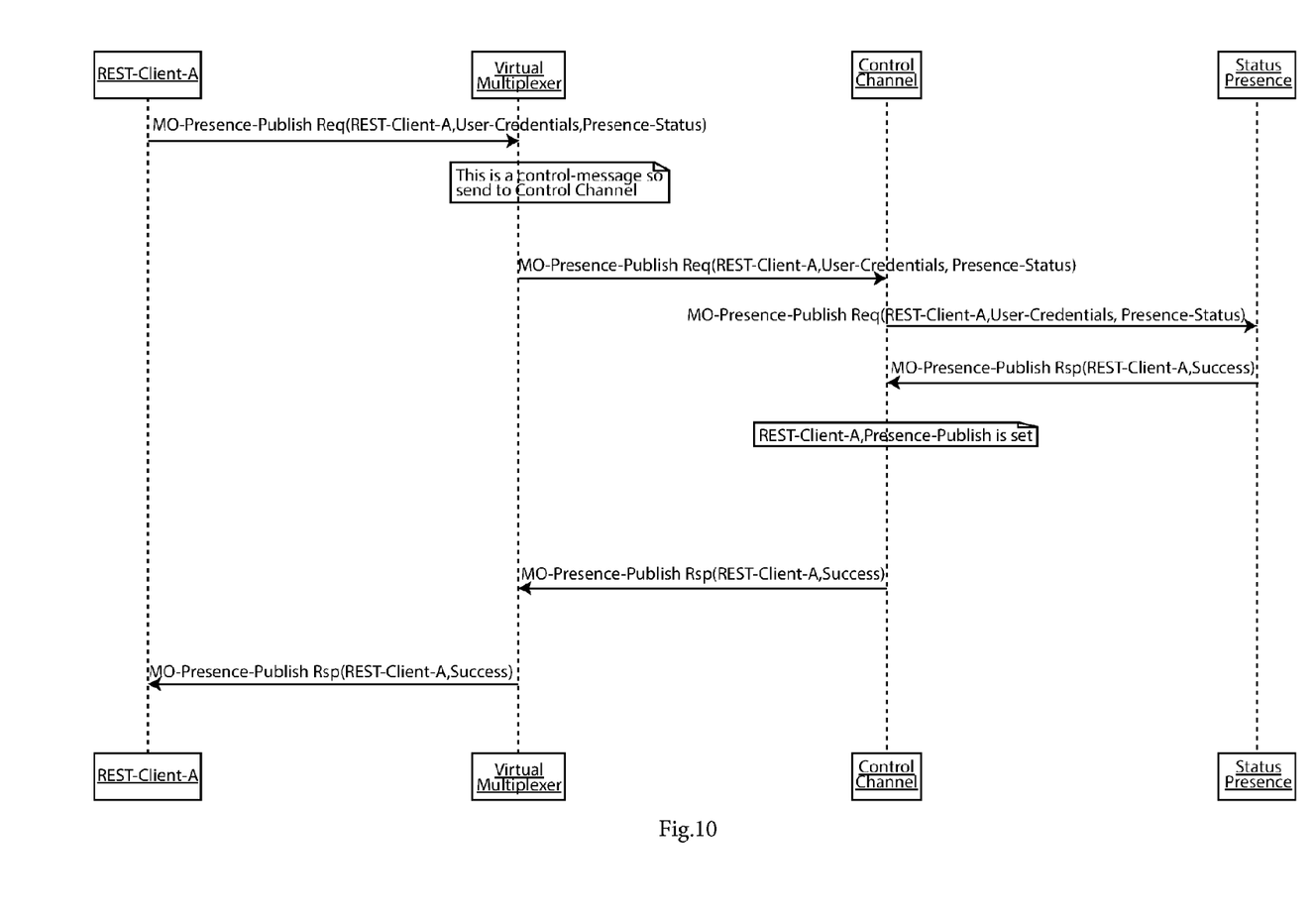
Figure 11:
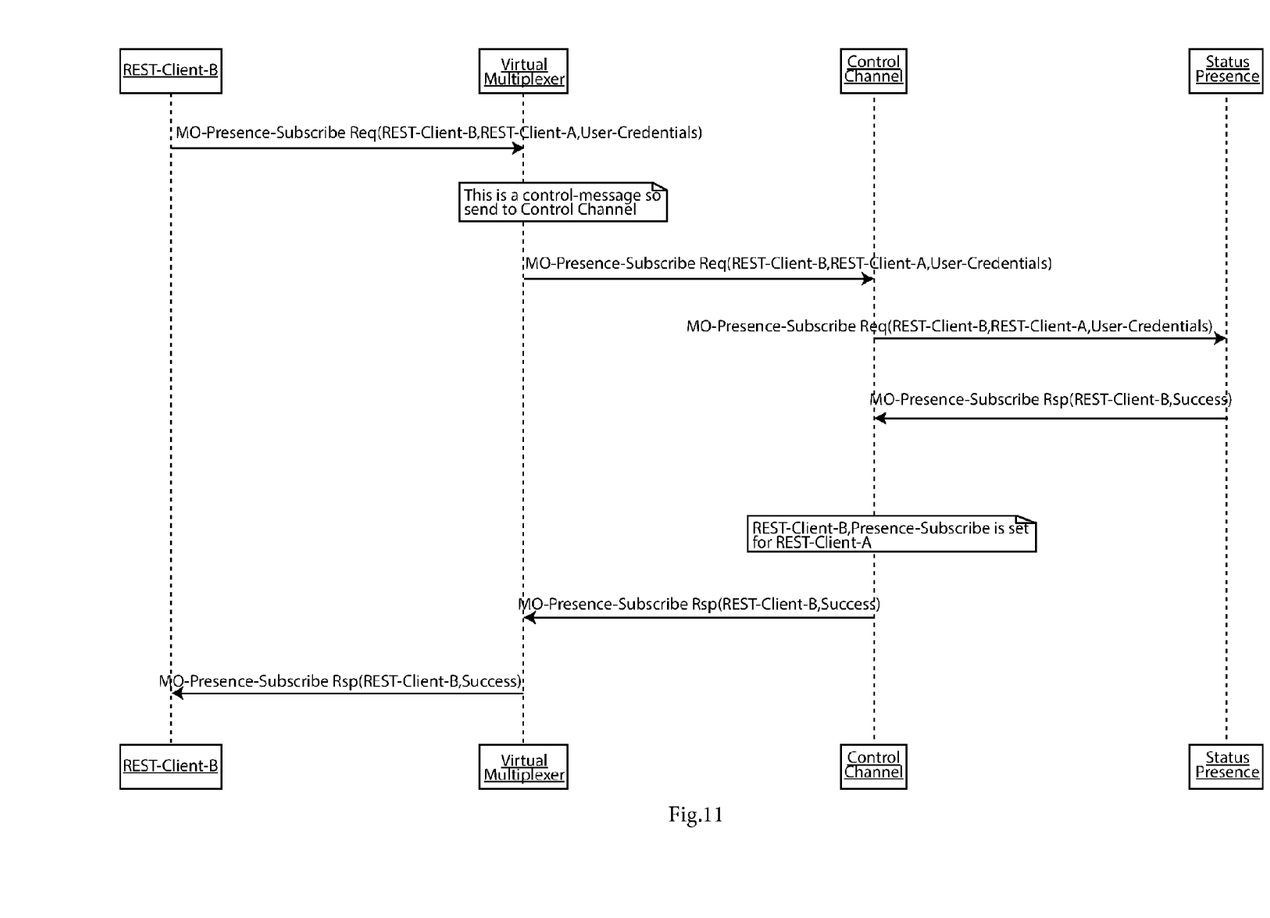
Figure 12:
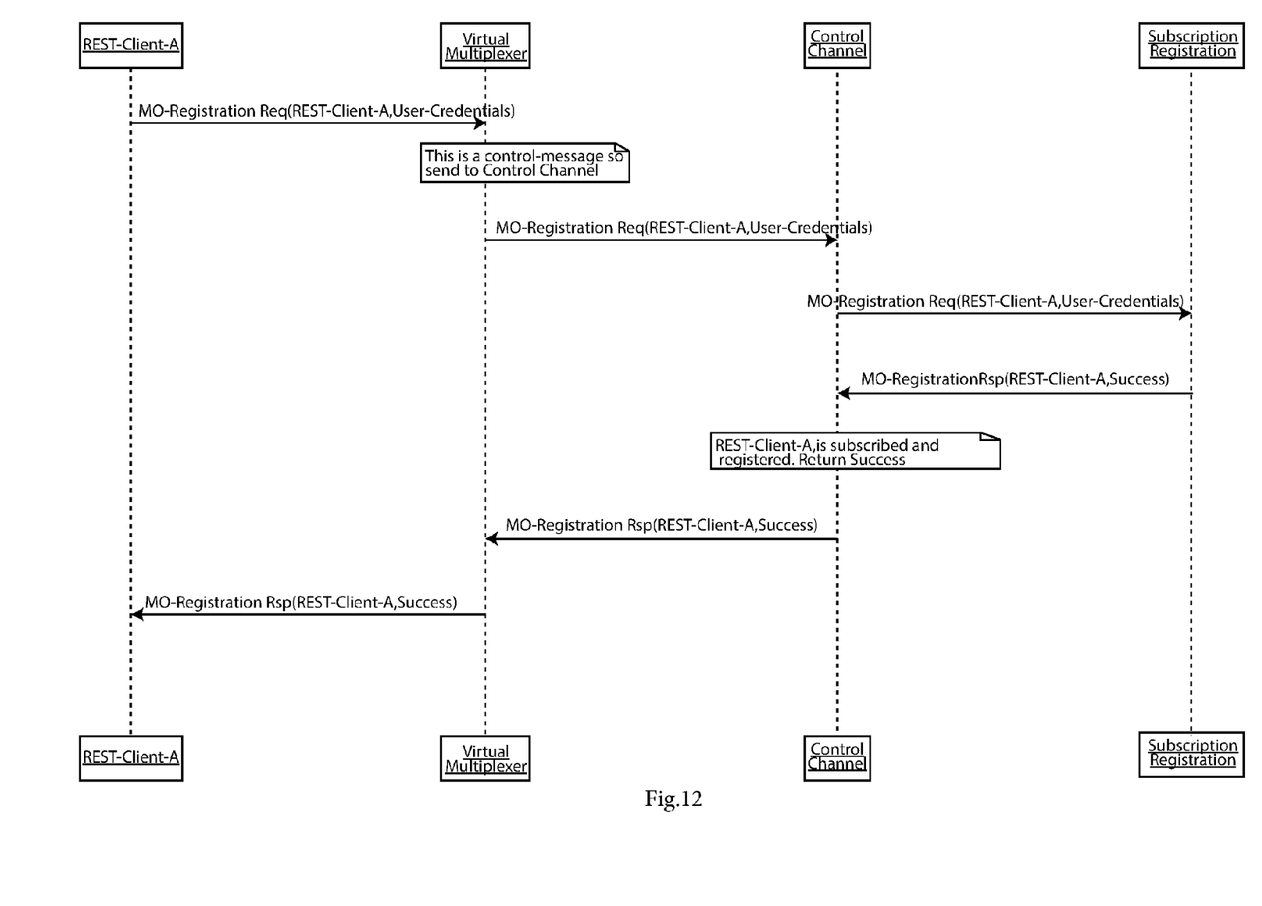

Depending on the scenario, the control channel 110 can either invoke the text channel via an asynchronous transaction where the text IM-server will utilize the store-and-forward function for storing the transaction or invoke the text channel via a synchronous transaction where the text IM-server will bypass the store-and-forward function and forward the transaction directly to the client FIGS. 5 to 12, show various scenarios namely:

FIG. 5, User Registration
FIG. 6, Presence Status Subscribe
FIG. 7, Presence Status Publish
FIG. 8, Presence Status Notify
FIG. 9, Person to Person Text New (102) to New (102)
FIG. 10, Person to Person Text New (102) to Legacy (51)
FIG. 11, Person to Person Text Legacy (51) to New (102)
FIG. 12, Person to Group Text New (102) to New (102)
The following sets out the flows in more detail.
FIG. 5, (User Registration) In this example the destination device is "enhanced", capable of receiving control data over REST. The overall sequence involves an MO from a legacy device 51 being sent as an MT to an enhanced device 102.
FIG. 6. (Presence Status Subscribe) The destination device is a legacy device 51, and the MO is sent directly by the text IM server 53. The store-and-forward facilities are used.
FIG. 7. (Presence Status Publish) In this case there is group messaging with all devices being members of the group and capable of sending and receiving over REST. Header meta data injected by the control channel 110 is recognized by the virtual multiplexer 104 and sent over REST.
FIG. 8. (User Presence Status Notify). This performed with control data injection by the control channel 110, and de-multiplexing by the multiplexer 104.
FIG. 9. Person to Person Text exchange, client 102 to client 102
FIG. 10. Person to Person Text exchange, client 102 to device 51
FIG. 11. Person to Person Text exchange, device 51 to client 102
FIG. 12. Person to Group Text exchange, client 102 to client 102

For the REST-interface definition there are separate sets of REST-methods for control and for message exchange. Although both are transferred over HTTP, these can be identified as separate channels.

It will be appreciated that the user of the client 2 or 102 is completely unaware of the messaging technologies like SMS or MMS (the description above referring to SMS also applies to MMS). Because of that there is also no problem with the operation of the client software. The messaging technology used on the client 102 uses HTTP transport for exchanging text and control data. The server 100 terminates the HTTP transport and selects the appropriate messaging technologies like SMS or MMS. The client 102 also has the ability to send control data over the REST-interface by using the REST-methods defined for Control exchange. The enhanced messaging server 100 detects this control data in the REST-interface and extracts the control-data. When the terminating client is also enhanced, the control-data can be used to exchange registration. presence status and user group information with the originating user client. When the terminating user client is not enhanced, the enhanced messaging server will fall back to conventional behaviour.

It will be appreciated that the invention provides in some embodiments a system and method in which there is a virtual control channel, and associated communication uses existing messaging infrastructure without the need to change the existing protocol mechanisms. It achieves enhancement of messaging experience through additional functionality. Also, there is centralized management and control over virtual control channel capabilities and use. Also, the client opt-in mechanism allows versatility for subscribers.

The network can utilize distributed processing for complex dialogue interactions. Also, the invention minimizes traffic flows between clients and the network through use of distributed logic and exchange of results instead of step-by-step handshake.

It will also be appreciated that the client can exchange meta data with the messaging infrastructure as well as with the recipient client if a use case would require this. The user interface of the client is able to assemble a control message and send this over the virtual control channel towards the enhanced messaging server 1. The control message header allows flexible implementation of message format and segmentation of the remainder payload into meta-data chunks. A control message as received over the virtual control channel by the virtual multiplexer 3 will be recognized on a unique identifier which can be based on messaging encoding. point codes, destination address, short code and/or header format. The virtual multiplexer parses the payload towards the various processing entities such as registration, status and user group servers. The processing entities could be extended with other functions such as API gateway towards content providers.

For the network operator additional services can be provided to clients which are not available with the prior art. For the client, the invention provides benefits such as global coverage and predictable payment on usage as well as seamless integration with other social presence domains.

The invention is not limited to the embodiments described but may be varied in construction and detail.

The invention claimed is:
1. A communication network comprising:
a messaging server; and
a plurality of user devices, wherein the messaging server and each of the user devices includes a control channel configured to send and receive control data, wherein the messaging server is configured to send control data to an originating device, wherein the control data indicates recipient availability, status, and/or presence prior to the originating device sending a message, and wherein
the messaging server comprises:
a message channel; and
a multiplexer for multiplexing into a single message to the devices a message payload stream from the message channel and a control data stream from the control channel,
wherein the control data stream includes at least one unique identifier that differentiates the control data stream from the message payload stream,
wherein the messaging server control channel is configured to enable end user initiated availability, status, and/or presence updates to be shared with the messaging network and with recipient devices,
wherein the messaging server is configured to provide seamless availability, status and/or presence sharing data within closed user groups without the need for state-oriented protocols, and
wherein the server control channel is configured to initiate a dialogue with each of the user devices a short response time including sending a trigger for each of the user devices to generate a user interface for inputting data.

2. The communication network as claimed in claim 1, wherein said control channel maintains device registration data, status data, presence data, and user group management data.

3. The communication network as claimed in claim 1, wherein the messaging server is configured to register and recognize enhanced messaging user devices and to recognize a type of information that can be shared with the user devices.

4. The communication network as claimed in claim 1, wherein the messaging server is configured to register and recognize enhanced messaging user devices and to recognize a type of information that can be shared with the user devices, and wherein the messaging server is configured to process control data in a stateless manner, in which each control data event is processed in a transaction that is independent of any previous or next control data event that is processed.

5. The communication network as claimed in claim 1, wherein at least some of said user devices are configured to perform device-to-device sharing of meta data, wherein said meta data contains control information including presence information, wherein the messaging server is configured to automatically perform a lookup on associated member updates, and wherein the messaging server is configured to automatically update a status/presence database and automatically perform a lookup on associated members in a user group table.

6. The communication network as claimed in claim 1, wherein at least some of said user devices are configured to perform device-to-device sharing of meta data, wherein said meta data contains control information including presence information, wherein the messaging server is configured to automatically perform a lookup on associated member updates, wherein the messaging server is configured to automatically update a status/presence database and automatically perform a lookup on associated members within a user group table, wherein the messaging server is configured to process mobile network management triggers when devices are registered or de-registered from the network, and wherein said triggers are received from an HLR or an HSS, or a VLR.

7. The communication network as claimed in claim 1, wherein the control channel is configured to differentiate conventional user messages from control messages by reading the at least one unique identifier.

8. The communication network as claimed in claim 1, wherein at least some of the user devices and the messaging server are configured to send and receive said control information as part of the payload of a conventional message.

9. The communication network as claimed in claim 1, wherein the messaging server and at least some of the user devices are configured to send and receive said control data using a packet-based protocol.

10. The communication network as claimed in claim 1, wherein the messaging server is configured to add control data to a message as payload of a conventional message, to send the message to a store-and-forward element that manages sending without parsing the control data, to return the message to the messaging server when the recipient device is ready to receive the message, and to send the message when the recipient device is ready to receive the message.

11. The communication network as claimed in claim 1, wherein the messaging server is configured to add control data to a message as payload of a conventional message, to send the message to a store-and-forward element which manages sending without parsing the control data, to return the message to the server when the recipient device is ready to receive the message, and to send the message when the recipient device is ready to receive the message, wherein the messaging server is configured to convert the control data to a packet-based protocol and send it to the recipient device in addition to sending the message, wherein the messaging server and the store-and-forward element are configured to retrieve from a profile database the status of the recipient device, and wherein the messaging server is configured to add control data only if the recipient device is capable of communicating with the packet-based protocol and interpret the control data.

12. A communication method implemented in a network comprising a messaging server and a plurality of user devices, wherein the messaging server and the user devices include control channels to send and receive control data, wherein the messaging server includes a message channel and a multiplexer, the method comprising:
sending, by the messaging server to an originating user device, control data indicating availability, status, and/or presence of a recipient user device prior to the originating user device sending a message;
multiplexing, by the multiplexer into a single message to the recipient user devices, a message payload stream from the message channel and a control data stream from the control channel, wherein the control data stream includes at least one unique identifier that differentiates the control data stream from the message payload stream;
enabling, by the messaging server, end user initiated availability, status, and/or presence updates to be shared with the messaging network and with the recipient user devices;
providing, by the messaging server, seamless availability, status and/or presence sharing data within closed user groups without the need for state-oriented protocols, and
initiating, by the server control channel, a dialogue with a user device having a short response time including sending a trigger for a user device to generate a user interface for inputting data.

13. The communication method as claimed in claim 12, wherein said control channel maintains device registration data, status data, presence data, and user group management data.

14. The communication method as claimed in claim 12, wherein the messaging server registers and recognizes enhanced messaging user devices and recognizes a type of information that can be shared with the enhanced messaging user devices.

15. The communication method as claimed in claim 12, wherein the messaging server registers and recognizes enhanced messaging user devices and recognizes a type of information which can be shared with the user devices, and wherein the messaging server processes control data in a stateless manner in which each control data event is processed in a transaction that is independent of any previous or next control data event that is processed.

16. The communication method as claimed in claim 12, wherein at least some of said user devices perform device-to-device meta data sharing, and wherein said meta data contains control information including presence information of other user devices.

17. The communication method as claimed in claim 12, wherein at least some of said user devices perform device-to-device sharing of meta data, wherein said meta data contains control information including presence information of other user devices, wherein the messaging server automatically performs a lookup on associated member updates, wherein the server automatically updates a status/presence database and automatically performs a lookup on associated members within a user group table, wherein the server processes mobile network management triggers when user devices are registered or de-registered from the network, and wherein said triggers are received from an HLR or an HSS, or a VLR.

18. The communication method as claimed in claim 12, wherein the server and at least some of the user devices send and receive said control data using a packet-based protocol, and wherein said pack-based protocol may be RESTful over HTTP/HTTPS.

19. The communication method as claimed in claim 12, wherein the messaging server adds control data to a message as payload of a conventional message, sends the message to a store-and-forward element that manages sending without parsing the control data, returns the message to the messaging server when a recipient device is ready to receive the message, and sends the message to the recipient device.

20. The communication method as claimed in claim 12, wherein the messaging server adds control data to a message as payload of a conventional message, sends the message to a store-and-forward element which manages sending without parsing the control data, returns the message to the messaging server when a recipient device is ready to receive the message, and sends the message to the recipient device, wherein the messaging server converts the control data to a packet-based protocol and sends it to the recipient device in addition to sending the message, wherein the messaging server and the store-and-forward element retrieve from a profile database the status of the recipient device, and wherein the messaging server adds the control data only if the recipient device is capable of communicating with the packet-based protocol and interpret the control data.

* * * * *